(12) United States Patent
Lich et al.

(10) Patent No.: US 8,515,624 B2
(45) Date of Patent: Aug. 20, 2013

(54) METHOD AND CONTROL DEVICE FOR DETECTING A DANGEROUS DRIVING CONDITION OF A VEHICLE

(75) Inventors: Thomas Lich, Schwaikheim (DE); Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/998,763

(22) PCT Filed: Nov. 10, 2009

(86) PCT No.: PCT/EP2009/064913
§ 371 (c)(1),
(2), (4) Date: Aug. 5, 2011

(87) PCT Pub. No.: WO2010/078987
PCT Pub. Date: Jul. 15, 2010

(65) Prior Publication Data
US 2011/0282516 A1 Nov. 17, 2011

(30) Foreign Application Priority Data
Jan. 8, 2009 (DE) .......... 10 2009 000 079

(51) Int. Cl.
G05D 1/00 (2006.01)
G05D 3/00 (2006.01)
G06F 7/00 (2006.01)
G06F 17/00 (2006.01)

(52) U.S. Cl.
USPC .............................. 701/46; 701/36

(58) Field of Classification Search
USPC ...... 701/1, 36, 80, 23, 70, 46, 65; 340/425.5, 340/12.25, 988; 705/34; 702/60; 250/221
See application file for complete search history.

(56) References Cited

U.S. PATENT DOCUMENTS

| | | | |
|---|---|---|---|
| 5,661,650 A | 8/1997 | Sekine et al. | |
| 6,014,595 A * | 1/2000 | Kobayashi | 701/1 |
| 7,109,850 B2 * | 9/2006 | Kawazoe et al. | 340/425.5 |
| 7,698,032 B2 * | 4/2010 | Matsumoto et al. | 701/36 |
| 8,050,839 B2 * | 11/2011 | Hitosugi et al. | 701/80 |
| 8,099,205 B2 * | 1/2012 | Coats et al. | 701/23 |
| 2011/0282516 A1 * | 11/2011 | Lich et al. | 701/1 |

FOREIGN PATENT DOCUMENTS

| | | |
|---|---|---|
| DE | 195 06 364 | 8/1995 |
| DE | 100 50 420 | 3/2003 |
| DE | 10 2005 003 177 | 7/2006 |
| EP | 1 538 019 | 6/2005 |
| EP | 1 582 440 | 10/2005 |

* cited by examiner

*Primary Examiner* — Thomas Black
*Assistant Examiner* — Robert Payne
(74) *Attorney, Agent, or Firm* — Kenyon & Kenyon LLP

(57) ABSTRACT

A method for detecting a dangerous driving condition of a vehicle located on a roadway is provided, which includes a step of receiving a first damping signal (310) via an interface, the first damping signal being suitable for representing a temporal progression of a vertical movement of a first wheel of the vehicle, a step of evaluating (312) the first damping signal in accordance with an evaluation rule, in order to obtain from the first damping signal a first probability value (314) for a departure of the first wheel from a roadway, and a step of providing an evaluation signal (316), the evaluation signal being designed to indicate a departure of the vehicle from the roadway, as a function of the first probability value.

16 Claims, 2 Drawing Sheets

METHOD AND CONTROL DEVICE FOR DETECTING A DANGEROUS DRIVING CONDITION OF A VEHICLE

BACKGROUND OF THE INVENTION

1. Field of the Invention

The present invention is related to a method and a control device for detecting a dangerous driving condition of a vehicle.

2. Description of Related Art

Studies in accident research show that a vehicle's departure from the roadway is one of the most frequent causes of accidents in traffic situations and thus is responsible for a significant number of injuries or even fatalities among road users.

Today, there is a whole series of systems whose objective is to detect or prevent a vehicle's departure from the roadway. In this context, above all mention should be made of the optical systems that use passive methods (camera-based) or active methods (LASER measurement of the surroundings) in an attempt to identify the roadway and the roadway boundaries and to prevent a departure from the roadway, in interaction with the occupant or with the aid of an active steering system and control systems.

In contrast, other methods attempt already to fight the cause of the departure from the roadway. In this case, in particular systems that are applied in the field of driver monitoring should be mentioned. One frequent cause of departing from the roadway is that the driver falls asleep at the wheel, whether due to exhaustion or other influences such as illness or alcohol consumption.

Another class of protective measures involves preventing a departure from the roadway through active safety systems, such as ESP, for example. Such safety systems intervene, for example, when the vehicle starts skidding.

Another class involves structural measures on the edge of the road. In this case, above all mention should be made of guardrails that are erected on the edge of the road or between two traffic lanes having opposite directions of travel.

In the field of suspension technology, so-called active suspensions are increasingly common. In these systems, a controlled system adjusts the suspension to the driving behavior and road condition. The controlled system is typically made up of sensors that measure the compression rate for each wheel suspension. With the aid of this information, a control device determines parameters that in turn adjust the damping properties of the dampers via valves. A corresponding driving dynamics control system of a motor vehicle is described in published German patent application document DE 100 50 420 A1, for example.

In the field of algorithms for accident detection and crash characterization, there are methods from the field of statistical learning methods and cognitive systems or classification methods, e.g., k-nearest neighborhood classification, support vector machines, hidden Markov methods, and vector quantization.

Methods for automatically correcting a condition variable of a vehicle departing from a predefined roadway are also known. In this case, if the vehicle has departed from the predefined roadway, a vehicle control system in the vehicle may be re-parametered in such a way that an intervention specified by the driver is converted in a reduced manner into a modification of a vehicle condition variable. This is to prevent an excessively strong counter-steering of the driver, so as to prevent the build-up of an oscillation in the vehicle.

It is known from published German patent application document DE 10 2005 003 177 A1 that if the correct lane is departed from, a counter-steering torque can be generated in the steering system of the vehicle, which counteracts the steering angle applied by the driver. This can help prevent vehicle accidents. Such lane keeping systems (lane keeping assist) aim to prevent an accident by keeping the vehicle in the predefined lane or by bringing it back into the lane. A complex sensor system is required for this purpose. The sensor system makes it possible to permanently monitor the current vehicle position in relation to the roadway, and in the event of an unacceptable deviation from the setpoint trajectory, a corresponding counter-steering torque can be generated.

In accordance with a vehicle control system known from published German patent application document DE 195 06 364 C2, the current vehicle position is determined with the aid of a navigation device. The vehicle speed can be corrected by an automatic braking and the vehicle position can be corrected by an automatic adjustment of the steering torque and of the steering angle, so that the vehicle can safely drive through a curve, for example.

In the "early pole crash detection" function, when skidding is detected by the ESP control device, the plausibility and/or a threshold adjustment for the triggering of lateral restraining devices is simplified. In this way, a faster triggering of the same is made possible.

The previously known methods have some deficiencies. Camera-based and laser-based methods offer the option of detecting the danger condition "departing from the roadway" in advance; however, both suffer from the fact that they are currently not yet sufficiently reliable. Thus, camera-based methods still have some problems in the case of insufficient lighting and poor and unclear roadway markings. The same holds true for the laser-based systems. For this reason, these methods are not yet produced and implemented on a large-scale. Additionally, such systems are associated with very high costs.

In the field of sleep detection, different systems are considered. However, there is still no market penetration in this instance either. The primary disadvantage of such systems is that only one of the causes of the departure from the roadway is detected.

The ESP system can prevent the departure from the roadway due to uncontrolled driving conditions in that it prevents the cause in this case, namely, the loss of control of the vehicle. However, if the vehicle departs from the road without skidding, for example, due to the inactivity of the driver, the system will not respond and thus will not provide any protection.

Structural measures always have the disadvantage of high expense (planning, approval) and of high costs (procurement, maintenance, repair). Apart from this, structural measures can even result in increased risk to other road users, such as motorcycle drivers, for example.

BRIEF SUMMARY OF THE INVENTION

Against this background, the present invention provides a method for detecting a dangerous driving condition of a vehicle located on a roadway, as well as a control device that uses this method, a corresponding computer program product, and finally a device for detecting a dangerous driving condition of a vehicle in accordance with the independent claims. Advantageous refinements are yielded from the respective dependent claims and the following description.

The present invention is based on the knowledge that it is possible to detect the driving condition "departing from the paved roadway" on the basis of characteristic signal patterns from one or a plurality of sensors. The sensors may be disposed in the dampers of the four wheel suspensions of the vehicle, for example. In this way, the driving condition "departing from the paved roadway" can be detected independently of forward-looking systems such as cameras, for example, and may be used in subsequent applications and devices to protect the vehicle and the passengers.

The approach according to the present invention allows for an early detection of the driving condition "departing from the paved roadway." A possible consequence of this is an early activation of counter measures or passenger protection measures. Counter measures may include waking the driver or directing the attention of the driver to the dangerous driving condition. Passenger protection measures may include activating or modifying the control of reversible or non-reversible passenger protection means such as seat-belt pretensioners or airbags. Additionally, vehicle-related, danger-minimizing measures, such as initiating an emergency braking or supporting stabilizing steering movements, for example, may be initiated in good time through the early detection of the dangerous driving condition.

One advantage of the present invention is that the driving condition "departing from the paved roadway" may be detected automatically, without using additional systems.

A system based on the approach according to the present invention may be operated in conjunction with other systems. For this purpose, an independent signal path may be advantageously produced alongside radar or optical systems. Such systems may thus be confirmed in their result.

A fundamental advantage of this invention consists in the further use of sensors that are already provided in intelligent dampers of a vehicle. This results in the option of combining the system areas of the restraining system and the suspension.

It is also advantageous that, for the purpose of cost reduction, the information may be available in the airbag control device, since a connection of the dampers to the airbag control device is possible. Thus, no additional expenditure on hardware is necessary. The scanning can occur in the 1 ms range, so that the information may also be evaluated for restraining system applications. This results in multiple uses for the damper system and a competence build-up for the restraining system.

Furthermore, it is advantageous that the information can also be used for other restraining system functions such as the rollover sensing, for example. For example, a departure from the roadway without skidding can be an indication that a rollover event is possibly occurring, on a slope, for example.

The system according to the present invention also has the advantage that it does not restrict itself to the causes of departing from the roadway, but rather detects the departing from the roadway itself.

In particular, the system according to the present invention is already suitable for production on a large scale and, to wit, at significantly lower costs than alternative systems that have a lower specialization in the considered application case.

In total, the advantages of the present invention can be seen in the provision of the information "departing from the paved roadway" at relatively low additional costs. Thus, such information and the safety-related use it allows may be provided to a user group that is significantly larger than the user group for current methods.

The present invention creates a method for detecting a dangerous driving condition of a vehicle located on a roadway, which includes the following steps: Receiving a first damping signal via an interface, the first damping signal being appropriate to represent a temporal progression of a vertical movement of a first wheel of the vehicle; evaluating the first damping signal in accordance with an evaluation rule, in order to obtain from the first damping signal a first probability value that the first wheel will depart from the roadway laterally; providing an evaluation signal that is designed to indicate that the vehicle is departing from the roadway, as a function of the first probability value.

The roadway may be a paved roadway, for example, an asphalted road. The dangerous driving condition may be an undesired departure of the vehicle from the roadway, for example. In this context, one or a plurality of the wheels of the vehicle may depart from the roadway and be located in a region next to the roadway. The damping signal may represent a signal of a sensor that is designed to detect directly or indirectly the vertical movement of the wheel. The damping signal may represent a compression and rebounding of the wheel on the wheel suspension over a predefined time period, for example. The evaluation rule may have one or a plurality of criteria, on the basis of which it is possible to estimate whether the wheel is inside of or outside of the paved roadway. The approach according to the present invention makes use of the fact that the frequency and amplitude of the vertical movements of the wheel when departing from the roadway and when next to the roadway are higher than when the wheel is located on the roadway. The probability value may include the assessment of the damping signal obtained using the evaluation rule. In particular, the probability value may indicate that in accordance with the evaluation rule, it is assumed that the wheel has departed from the roadway. The evaluation signal may be determined from the probability value in accordance with a determination rule. The evaluation signal may indicate that the vehicle is departing from the roadway and, for example, be provided to trigger a warning to the driver, to control passenger protection means or vehicle-related danger-reducing measures.

In accordance with one design, the method according to the present invention may also include the following steps: Receiving a second damping signal via the interface, the second damping signal being suitable for representing a temporal progression of a vertical movement of a second wheel of the vehicle; evaluating the second damping signal in accordance with the evaluation rule, in order to obtain from the second damping signal a second probability value that the second wheel will depart from the roadway laterally; and providing the evaluation signal that is designed to indicate that the vehicle is departing from the roadway, as a function of the first probability value and the second probability value. By taking into account the signal progressions of two wheels, it is possible to ascertain the driving condition "departing from the roadway" with more precision. The first wheel may be a front wheel and the second wheel may be a rear wheel of the vehicle.

For example, the evaluation signal may be designed to indicate the departure from the roadway when the first probability value indicates the first wheel departing from the roadway, and the second probability value indicates the second wheel departing from the roadway within a predefined time period after the first probability value indicates the departure. It is thus possible to take into account the condition that in normal driving conditions, first the front wheel and subsequently the rear wheel located on the same vehicle side leaves the roadway. This makes it possible to avoid an incorrect decision.

In accordance with one design, the method according to the present invention may include a step of receiving information about a vehicle speed via the interface and a step of determining the vehicle's angle of entrance into a roadway boundary based on the information about the vehicle speed and a time period between the first probability value indicating the first wheel departing from the roadway and the second probability value indicating the second wheel departing from the roadway. Thus, it is possible to create a delimitation from off-road use of the vehicle.

The evaluation rule may be designed to compare the damping signal to a predefined comparison value in order to obtain the probability value. This allows for a simple and cost-effective classification of the damping signal.

The evaluation rule may also be designed to compare, on the basis of the damping signal, an average value and/or a distribution of the vertical movement of the wheel within a predefined time interval to the predefined comparison value. By using the average value and the distribution, short-term disruptions, for example, due to roadway irregularities or potholes, can be suppressed.

In accordance with an additional design, the method according to the present invention may include a step of receiving driving dynamics information of the vehicle via the interface, and the evaluation signal may further be designed to indicate that the vehicle is departing [the roadway], on the basis of driving dynamics information. Thus, for example, the vehicle speed, the yaw rate, or the transverse acceleration of the vehicle may be taken into account in the evaluation.

The evaluation signal may be provided using a classification method. For example, the classification method may be designed to determine a classifier that indicates that the vehicle is departing from the roadway, on the basis of temporally preceding damping signals and temporally preceding driving dynamics information. The classification method allows for the application of methods from statistical learning theory. In this manner, the danger of incorrect decisions may be further reduced.

The object underlying the present invention may be achieved quickly and efficiently by the embodiment variant of the present invention in the form of a control device, as well. In the case at hand, a control device is an electric device that processes sensor signals and outputs control signals as a function thereof. The control device may have an interface, which may be implemented as hardware and/or software. In a hardware design, the interfaces may, for example, be part of a so-called system ASIC that contains various functions of the control device. However, it is also possible for the interfaces to be separate, integrated circuits or to be at least partially made up of discrete components. In a software design the interfaces may be software modules that are present on a microcontroller in addition to other software modules, for example.

An advantageous development includes a computer program product having program code that is stored on a machine-readable medium such as a semiconductor memory, a hard-disk memory or an optical memory, which is used to implement the method according to one of the specific embodiments described above, when the program is executed in a control device.

The present invention also creates a device for detecting a dangerous driving condition of a vehicle located on a roadway, which includes the following features: at least one sensor that is designed to record a temporal progression of a movement of a wheel, that is, for example, a vertical movement of a wheel of the vehicle, and to provide it as a damping signal; and a control device according to the present invention that is designed to receive the damping signal. Thus, the present invention provides a system that allows for the detection of a dangerous driving condition alone or in combination with other systems.

BRIEF DESCRIPTION OF THE DRAWINGS

In the following, the present invention is explained in greater detail by way of example with reference to the attached drawings. The figures show.

DETAILED DESCRIPTION OF THE INVENTION

Figure 1:
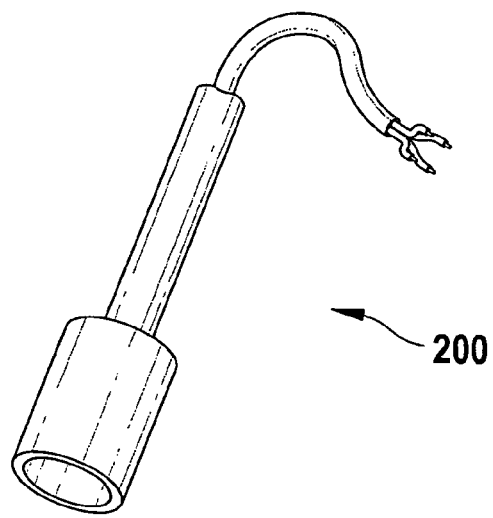
FIG. 1 shows an illustration of a damper piston.

Identical or similar elements may have the same or similar reference numerals in the following figures. Furthermore, the figures in the drawing, their description and the claims contain numerous features in combination. In this context, it is clear to one skilled in the art that these features may also be considered individually or may be combined to form further combinations not explicitly described here.

FIG. 1 shows an illustration of an intelligent damper 200. Intelligent damper 200 has sensors. These sensors are able to provide a damper signal suitable for the approach according to the present invention.

Figure 2:
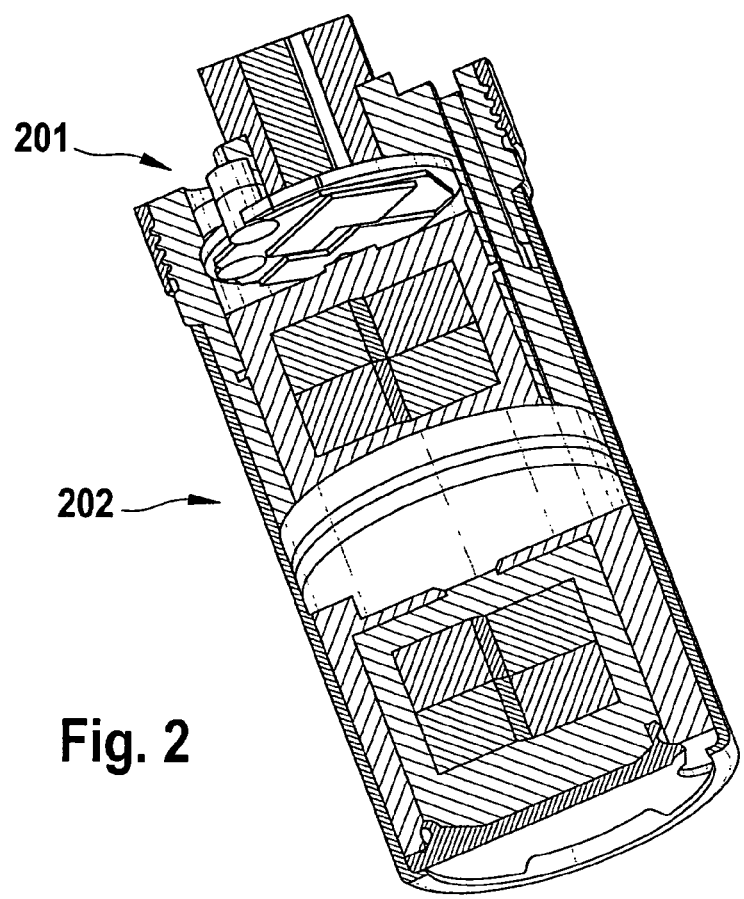
FIG. 2 shows an illustration of damper piston mechatronics.

FIG. 2 shows an illustration of the mechatronics of the damper shown in FIG. 1, in accordance with one exemplary embodiment of the present invention. A control unit 201 having one or a plurality of pressure sensors as well as one or a plurality of independently controllable valves 202 for compression and rebounding are shown. It is possible for valves 202 to be continually adjustable. The switching time is minimized and a large bandwidth is provided for the damping characteristic. The damper use may be implemented both in one-tube standard dampers and in two-tube standard dampers.

In the field of sensor equipment, the approach according to the present invention does not require any expansions relative to vehicles equipped with intelligent dampers. In the dampers shown in FIGS. 1 and 2, one or a plurality of pressure sensors are provided in each damping element. It is possible for the pressure sensors to produce the measurement variable "compression rate" as a data product. According to the present invention, it is possible to supply the at least four measurement variables deriving from four wheels to an evaluation algorithm. Additionally, it is possible to take into account other sensor data. It is possible for the evaluation algorithm to decide whether the condition "vehicle departing from the paved roadway" has occurred or not.

Figure 3:
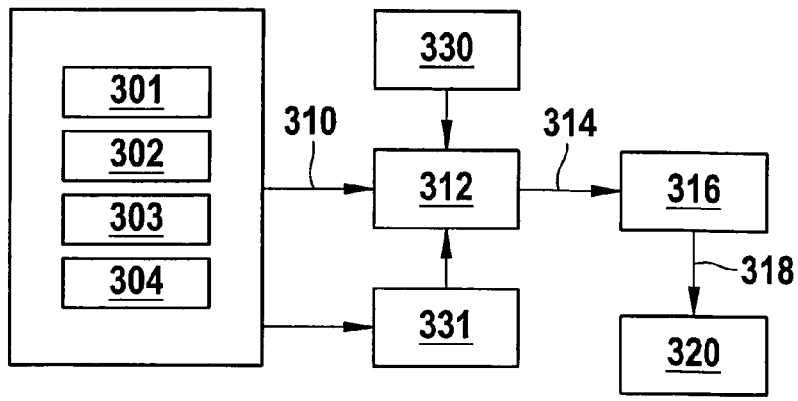
FIG. 3 shows a flow chart of a method according to one exemplary embodiment of the present invention.

FIG. 3 illustrates a flow chart of a method for detecting a dangerous driving condition of a vehicle, in accordance with one exemplary embodiment of the present invention. A first sensor 301, a second sensor 302, a third sensor 303, and a fourth sensor 304 are shown. Sensors 301, 302, 303, 304 may be damper sensors. Sensors 301, 302, 303, 304 may be respectively designed to represent a temporal progression of a vertical movement of a wheel of the vehicle and to provide it as damper signal 310 to an evaluation algorithm 312. For example, the damper signal may represent a compression rate of the dampers assigned to sensors 301, 302, 303, 304. Evaluation algorithm 312 may be designed to evaluate damper signal 310 in accordance with an evaluation rule, in order to obtain from damper signal 310 a probability value 314 for a departure of the wheels assigned to sensors 301, 302, 303, 304. From probability value 314, a device 316 can determine whether the paved roadway is being departed from or not. An evaluation signal 318 can be provided by device 316 to a device 320 for further use. Evaluation signal 318 may be designed to indicate that the vehicle is departing from the roadway.

In accordance with the exemplary embodiment shown in FIG. 3, in addition to data 310 about the compression rate of damper sensors 301, 302, 303, 304, a vehicle speed 330 and an output of suspension control 331 may be used in evaluation algorithm 312. Vehicle speed 330 and the output of suspension control 331 may be provided by additional sensors or control devices. In particular, the output of suspension control 331 can be performed by damper sensors 301, 302, 303, 304.

Figure 4:
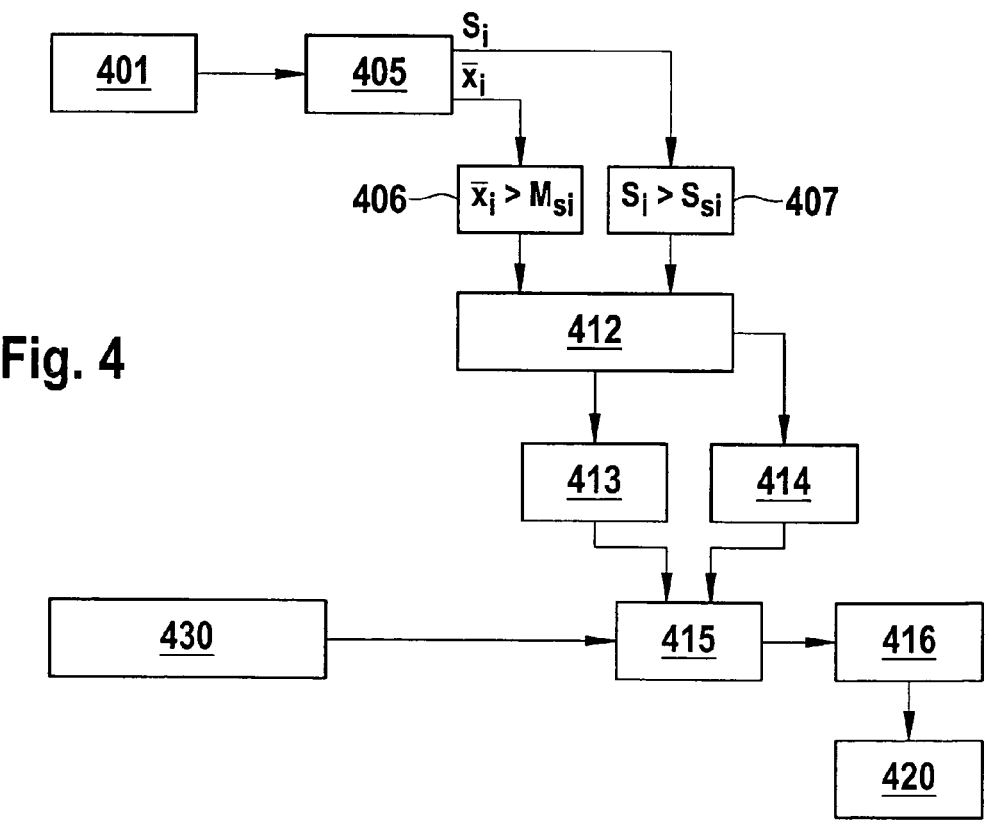
FIG. 4 shows a flow chart of a method according to the present invention, in accordance with one exemplary embodiment of the present invention.

FIG. 4 illustrates a flow chart of an implementation of the method for detecting a dangerous driving condition of a vehicle, in accordance with one exemplary embodiment of the present invention. A first possible algorithmic processing is shown.

A sensor 401, which stands for a sensor i, where i=1, 2, 3, 4, is shown. Sensor 401 is designed to provide a signal to a filter 405. Filter 405 is designed to provide an average value of the signal of respective sensor 401 to a comparison device 406 and a distribution of the signal of the respective sensor 401 to a comparison device 407. Comparison devices 406, 407 are designed to provide one comparison result respectively to a logic 412, for example, an AND link. If logic 412 makes a positive decision "yes," then a marker i=1 is set in a setting device 413. Marker i is assigned to i-th sensor 401. If logic 412 makes a negative decision "no," then marker i=0 is set in a setting device 414. The value of marker i is provided to a logic 415. In the case of a positive decision "yes," logic 415 can provide information 416 "roadway departed" to an application 420. In order to make the decision, logic 415 can furthermore be designed to receive driving dynamics data 430 and to take these into account in the evaluation.

In accordance with one exemplary embodiment, it is possible to calculate the statistical measurement variables average value M and distribution S for each of the i sensors 401 within a predefined time window of length t. If the road surface is even, the distribution around the average value will be slight. However, if the road surface is uneven, as is frequently the case in the event of an unpaved edge of roadway, the distribution around the average value will be greater. Each of the calculated values may be compared with an assigned adjustable threshold value $M_s$ and $S_s$. This may take place in comparison devices 406, 407. If both threshold values are exceeded, a marker for the wheel assigned to this sensor may be set. Alternatively, in an alternative implementation, the marker may be set when one of the two threshold values is exceeded. The markers can be set in setting devices 413, 414. If the condition that led to the setting of the marker is no longer fulfilled, the marker can be deleted once again. As long as this marker is set for one of the two front wheels, and the corresponding marker is also set within a predefined time window for the respective rear wheel, then it can be inferred with a great degree of certainty that the vehicle is departing from the paved roadway. In this context the activation pattern ensures that no incorrect decision is made. Thus, for example, an incorrect decision can be avoided, for example, if an activation of the rear wheel takes place first, the vehicle is in normal driving operation, and there is no tendency for oversteering. Similar situations may be caught via logic 415, for example, in that additional driving dynamics variables 430 such as the yaw rate are checked. Then, in an additional processing step, vehicle data such as the vehicle speed, the yaw rate, or the transverse acceleration may be taken into account in the decision. Likewise, other sensor information such as from an attitude-angle sensor system, for example, may be integrated in the decision.

In accordance with an additional exemplary embodiment, the angle of entrance by which the vehicle enters a region outside of the roadway may be determined. The angle at which the vehicle leaves the roadway may additionally be determined using the vehicle speed and the use of a known geometric wheel distance.

Additionally, it is possible to install a confirmation inquiry. If the vehicle speed is under a predefinable level, the information "vehicle is departing from the predefined roadway" may be disregarded as unimportant, since departing from the roadway at low vehicle speeds in general does not have negative consequences.

Additionally, the threshold values with which the values of average value M and distribution S are compared, and the time window in which the values M and S are compared may be considered a function of the vehicle speed. In the event of an unevenness of the ground, the fluctuation around the average value will initially increase as the vehicle speed increases, only to then decrease again at an even higher speed. It is also possible to include the output of the suspension control in the consideration as an additional characteristic. In vehicles having an active suspension, the suspension properties, and thus also the properties of the measurement signals, are changed using the feedback loop. This effect may be taken into account in an evaluation algorithm using correction factors.

Instead of or in addition to the values of average value. M and distribution S, it is possible to use other characteristics that may be derived from the sensor data. For example, the signal energy, the absolute value and the like may be used. Furthermore, from these characteristics, the first or a higher integral or the first or a higher derivation may be used, which are respectively related to the time or to one of the other characteristics.

In accordance with an additional exemplary embodiment, the method according to the present invention may be implemented using methods from statistical learning theory. In the statistical learning theory, typically a so-called classifier is set (trained) using predefined data sets. For example, in this context the data sets are made up of the four groups of sensor data of the sensors 301, 302, 303, 304 shown in FIG. 3 and vehicle speed 330 (in general called "characteristics" or characteristic space in the following), for example. For different driving situations, such as, for example, normal driving, driving on an uneven roadway, departing from the road at a high speed, departing from the road at a low speed, and the like, these data are now recorded and divided into two classes, "normal driving" and "leaving the paved roadway," in accordance with the predefined question. With the aid of the training data set thus created, a classification method, such as, for example, k-nearest neighborhood, support vector machine, or a similar method may be trained in accordance with the requirement of the respective method and implemented in a control device. Subsequently, a classifier trained in this manner is able to assign all measured characteristics to one of the two classes in accordance with the learned behavior, in real time in the application case in the vehicle, that is, in any driving situation. If an event is assigned to the class "departing from the paved roadway," the danger situation is detected and may be used further as information. The advantage of using methods from the statistical learning theory is in the flexibility of their application. If data of other measurement principles and other sensor data are available, these data may be integrated into the decision algorithm without modifying the classification principle and the training method by simply expanding the characteristic space. Examples of such sensor data (characteristics) may be measurement values of the respective tire pressure, vehicle transverse accelerations, vehicle yaw rates, or the like. Likewise, it is possible to integrate data from camera systems or laser systems into the decision process using such a method. Characteristics derived therefrom, such as condition of the road shoulder, may be coded as a numeric value and used as an additional characteristic for the situation classification.

An additional advantage of the classification method is the automatic applicability of the decision algorithm to different vehicles and suspensions. In as much as a suitable training data set exists, the classifier is set completely automatically, without subjectively influenced manual interventions by an implementer. The classification result may be used to increase the safety of the passengers and the vehicle.

Obtaining information of "the paved roadway" may be the first step in a safety system. In an additional step, the information "of the paved roadway" may be used in a constructive manner. The following additional steps are conceivable.

When the danger situation "departing from the roadway" is detected, a reversible restraining device, for example, a reversible seatbelt pretensioner, may be triggered. On the one hand, early tightening directs the attention of the passenger to a possible danger situation, and on the other hand in the event of subsequent collision of the vehicle, the protective action of the restraining systems is improved. Other reversible passenger protection means may be active seats and active mechanical structural elements, for example. One example of active structural elements is, for example, an element that stiffens the lateral structure of the vehicle using bar elements in the door, so that in the case of a lateral collision the intrusion of the structure is slighter, or also a connection of the door and the seat structure.

An additional option consists in influencing a traditional control algorithm for passenger protection means. Through the information obtained in this manner, a passenger protection algorithm may be adjusted to achieve a better protective effect. For example, the passenger protection algorithm may be made more sensitive. In this manner, earlier triggering times of an airbag are possible, for example. This is associated with a correspondingly better protective effect for the relevant passengers, if a corresponding triggering threshold is reduced. Furthermore, particular passenger protection means may be activated or deactivated in a targeted manner. Another option consists in simplifying the plausibility procedure that exists as a safety mechanism in an airbag triggering algorithm. In the case of detecting such a situation, it is possible to dispense with the traditional plausibility, and the detection of the situation may function as a substitute plausibility. By this means, it is possible to achieve a faster triggering time, for example, in the event of a lateral crash following a departure from the roadway.

It is possible to vary the influence on a restraining system triggering algorithm when the triggering algorithm is already based on a classification algorithm. In this case, by simply expanding the characteristic space of this algorithm, the information about departing from the paved road may be integrated implicitly. On the one hand, it is possible to take into account the end result of the first classification, that is, the information "normal drive" or "departing from the paved roadway" as a new characteristic in the triggering classifier. An additional technical implementation consists in a method in which the characteristics (sensor data), which hitherto were supplied to the first classifier for detecting the driving condition, are now provided directly to the triggering classifier. The latter will now use the training data set to put itself in such an internal condition that the information about the driving condition now enters into a triggering decision in an optimal manner (in the sense of statistics), without being explicitly available as such. The sensors of the active suspension control thus become an integrated component of the passive restraining system.

Likewise, other technical means for reducing danger may be triggered. Examples of this include the introduction of an automatic emergency braking, the introduction of an automatic steering maneuver, the emission of a honking sound, or the activation of specific communication channels, for example, for communication with other vehicles (car2car) or with infrastructure objects (car2infrastructure), and the like.

It is likewise conceivable to prefill the brake system. By this means, in the event of a brake request, a deceleration may be implemented immediately.

According to the present invention, it is possible in the field of control devices to combine the functionalities for the restraining system control and the active suspension control in one shared control device. Thus, the sensor data of the damper sensors are available for the triggering of restraining systems without extra expense.

The described exemplary embodiments are selected only as examples and may be combined with each other. In particular, the described method steps may also be implemented in another sequence and implemented repeatedly.

The invention claimed is:

1. A method for detecting a dangerous driving condition of a vehicle located on a roadway, comprising:
   receiving a first damping signal via an interface, the first damping signal being suitable for mapping a time profile of a vertical movement of a first wheel of the vehicle;
   evaluating the first damping signal in accordance with an evaluation rule in order to obtain from the first damping signal a first probability value for a lateral departure of the first wheel from the roadway; and
   providing an evaluation signal that is designed to indicate that the vehicle is departing from the roadway, as a function of the first probability value.

2. The method in accordance with claim 1, further comprising:
   receiving a second damping signal via the interface, the second damping signal being suitable for representing a temporal progression of a vertical movement of a second wheel of the vehicle;
   evaluating the second damping signal in accordance with the evaluation rule in order to obtain from the second damping signal a second probability value for a lateral departure of the second wheel from the roadway; and
   providing the evaluation signal that is designed to indicate that the vehicle is departing from the roadway, as a function of the first probability value and the second probability value.

3. The method as recited in claim 2, in which the evaluation signal is designed to indicate the departure from the roadway when the first probability value indicates that the first wheel is departing from the roadway and the second probability value indicates that the second wheel is departing from the roadway, within a predefined time period after the first probability value indicates the departure.

4. The method as recited in claim 2, further comprising:
   receiving information about a vehicle speed via the interface and a step of determining the vehicle's angle of entrance into a roadway boundary based on the information about the vehicle speed and a time period between the first probability value indicating the first wheel departing from the roadway and the second probability value indicating the second wheel departing from the roadway.

5. The method as recited in claim 3, further comprising: receiving information about a vehicle speed via the interface and a step of determining the vehicle's angle of entrance into a roadway boundary based on the information about the vehicle speed and a time period between the first probability value indicating the first wheel departing from the roadway and the second probability value indicating the second wheel departing from the roadway.

6. The method as recited in claim 1, in which the evaluation rule is designed to compare the damping signal to a predefined comparison value, in order to obtain the probability value.

7. The method as recited in claim 2, in which the evaluation rule is designed to compare the damping signal to a predefined comparison value, in order to obtain the probability value.

8. The method as recited in claim 3, in which the evaluation rule is designed to compare the damping signal to a predefined comparison value, in order to obtain the probability value.

9. The method as recited in claim 6, in which the evaluation rule is designed to compare, on the basis of the damping signal, an average value or a distribution of the vertical movement of the wheel within a predefined time interval to the predefined comparison value.

10. The method as recited in claim 1, further comprising: receiving driving dynamics information from the vehicle via the interface, wherein the evaluation signal is designed to indicate the departure of the vehicle also on the basis of driving dynamics information.

11. The method as recited in claim 2, further comprising: receiving driving dynamics information from the vehicle via the interface, wherein the evaluation signal is designed to indicate the departure of the vehicle also on the basis of driving dynamics information.

12. The method as recited in claim 3, further comprising: receiving driving dynamics information from the vehicle via the interface, wherein the evaluation signal is designed to indicate the departure of the vehicle also on the basis of driving dynamics information.

13. The method in accordance with claim 10, in which the evaluation signal is provided using a classification method.

14. A control device for detecting a dangerous driving condition of a vehicle located on a roadway, comprising:
an arrangement for performing the following:
receiving a first damping signal via an interface, the first damping signal being suitable for mapping a time profile of a vertical movement of a first wheel of the vehicle;
evaluating the first damping signal in accordance with an evaluation rule in order to obtain from the first damping signal a first probability value for a lateral departure of the first wheel from the roadway; and
providing an evaluation signal that is designed to indicate that the vehicle is departing from the roadway, as a function of the first probability value.

15. A non-transitory computer-readable data storage medium storing a computer program having program codes which, when executed on a computer, performs a method for detecting a dangerous driving condition of a vehicle located on a roadway, the method comprising:
receiving a first damping signal via an interface, the first damping signal being suitable for mapping a time profile of a vertical movement of a first wheel of the vehicle;
evaluating the first damping signal in accordance with an evaluation rule in order to obtain from the first damping signal a first probability value for a lateral departure of the first wheel from the roadway; and
providing an evaluation signal that is designed to indicate that the vehicle is departing from the roadway, as a function of the first probability value.

16. A device for detecting a dangerous driving condition of a vehicle located on a roadway, comprising:
at least one sensor that is designed to detect a temporal progression of a vertical movement of a wheel of the vehicle and to provide it as a damping signal; and
a control device for performing the following:
receiving a first damping signal via an interface, the first damping signal being suitable for mapping a time profile of a vertical movement of a first wheel of the vehicle,
evaluating the first damping signal in accordance with an evaluation rule in order to obtain from the first damping signal a first probability value for a lateral departure of the first wheel from the roadway, and
providing an evaluation signal that is designed to indicate that the vehicle is departing from the roadway, as a function of the first probability value.

* * * * *